United States Patent [19]

Abe

[11] Patent Number: 5,191,361
[45] Date of Patent: Mar. 2, 1993

[54] IMAGE REPRODUCING SYSTEM

[75] Inventor: Shunichi Abe, Kawasaki, Japan

[73] Assignee: Canon Kabushiki Kaisha, Tokyo, Japan

[21] Appl. No.: 391,314

[22] Filed: Aug. 9, 1989

Related U.S. Application Data

[60] Division of Ser. No. 323,162, Mar. 15, 1989, Pat. No. 4,888,636, which is a continuation of Ser. No. 586,774, Mar. 3, 1984, abandoned.

[30] Foreign Application Priority Data

| Mar. 8, 1983 | [JP] | Japan | 58-37709 |
| Mar. 8, 1983 | [JP] | Japan | 58-37710 |
| Mar. 8, 1983 | [JP] | Japan | 58-37711 |

[51] Int. Cl.$^5$ .......................... G03G 15/01; G03F 3/08
[52] U.S. Cl. .................................. 346/157; 355/326; 358/80
[58] Field of Search ............... 355/200, 202, 203, 208, 355/214, 326; 358/75, 80, 298, 300; 346/157

[56] References Cited

U.S. PATENT DOCUMENTS

| 3,799,668 | 3/1974 | McVeigh | 355/326 X |
| 3,995,958 | 12/1976 | Pfahl et al. | 356/928 |
| 4,204,223 | 5/1980 | Gast et al. | 358/80 |
| 4,215,930 | 8/1980 | Miyakawa et al. | 355/208 |
| 4,236,809 | 12/1980 | Kermisch | 355/326 |
| 4,285,009 | 8/1981 | Klopsch | 358/76 |
| 4,300,158 | 11/1981 | Morgenfruh et al. | 358/80 |
| 4,305,094 | 12/1981 | Yamada | 358/80 |
| 4,328,515 | 5/1982 | Wellendorf | 358/80 |
| 4,340,905 | 7/1982 | Balding | 358/80 |
| 4,346,401 | 8/1982 | Ohard | 358/75 |
| 4,350,435 | 9/1982 | Fiske et al. | 355/214 X |
| 4,354,758 | 10/1982 | Futaki | 355/208 |
| 4,479,242 | 10/1984 | Kurata | 355/326 X |
| 4,534,642 | 8/1985 | Miura et al. | 355/214 |

FOREIGN PATENT DOCUMENTS

| 1138521 | 12/1982 | Canada . |
| 2632017 | 2/1977 | Fed. Rep. of Germany . |
| 2607623 | 9/1977 | Fed. Rep. of Germany . |
| 2848376 | 5/1980 | Fed. Rep. of Germany . |
| 52-13377 | 2/1977 | Japan . |
| 1540525 | 2/1979 | United Kingdom . |
| 2016238 | 9/1979 | United Kingdom . |
| 2070885 | 9/1981 | United Kingdom . |

*Primary Examiner*—Fred L. Braun
*Attorney, Agent, or Firm*—Fitzpatrick, Cella, Harper & Scinto

[57] ABSTRACT

An image forming apparatus is provided with a signal generator for generating a pattern signal with plurality of tonality levels. An image forming apparatus is moveable in relation to an image forming medium and includes plural image forming stations sequentially arranged, for each of a plurality of color components, in relation movement direction of the image forming medium. Each of the image forming stations form an image for each color component on the basis of the pattern signal. A circuit is provided for discriminating a reproduction condition of tonality in accordance with the formed color image. A control controls a color balance of the form color image in accordance with the discrimination result by the discriminating circuit.

13 Claims, 12 Drawing Sheets

DIRECTION OF OPTICAL SCAN

DISPLACING DIRECTION OF COPY SHEET

FIG. 11

| 1D16 | 1D17 | 1D18 | 1D19 | 1D1A | 1D1B | 1D1C | 1D1D | 1D1E | 1D1F | 1D20 | 1D21 | 1D22 | 1D23 | 1D24 |
|------|------|------|------|------|------|------|------|------|------|------|------|------|------|------|
| 00 | 00 | 00 | 00 | 00 | 00 | 00 | 00 | FF | FF | 00 | 00 | 00 | 00 | 00 |
| 1E16 | 1E17 | 1E18 | 1E19 | 1E1A | 1E1B | 1E1C | 1E1D | 1E1E | 1E1F | 1E20 | 1E21 | 1E22 | 1E23 | 1E24 |
| 00 | 00 | 00 | 00 | 00 | 00 | 00 | 00 | FF | FF | 00 | 00 | 00 | 00 | 00 |
| 1F16 | | | | | | | | | | | | | | |
| 00 | | | | | | | | | | | | | | |
| 2016 | | | | | | | | | | | | | | |
| 00 | | | | | | | | | | | | | | |
| 2116 | | | | | | | | | | | | | | |
| 00 | | | | | | | | | | | | | | |
| 2216 | | | | | | | | | | | | | | |
| 00 | | | | | | | | | | | | | | |
| 2316 | | | | | | | | | | | | | | |
| 00 | | | | | | | | | | | | | | |
| 2416 | 2417 | 2418 | 2419 | 2420 | 2421 | 2422 | 2423 | 2424 | 2425 | 2426 | 2427 | 2428 | 2429 | 242 |
| FF | FF | FF | FF | FF | FF | FF | FF | FF | FF | FF | FF | FF | FF | FF |
| 2516 | 2517 | | | | | | | | | | | | | |
| FF | FF | | | | | | | | | | | | | |
| 2616 | | | | | | | | | | | | | | |
| 00 | | | | | | | | | | | | | | |
| 2716 | | | | | | | | | | | | | | |
| 00 | | | | | | | | | | | | | | |
| 2816 | | | | | | | | | | | | | | |
| 00 | | | | | | | | | | | | | | |
| 2916 | | | | | | | | | | | | | | |
| 00 | | | | | | | | | | | | | | |
| 2A16 | | | | | | | | | | | | | | |
| 00 | | | | | | | | | | | | | | |
| 2B16 | | | | | | | | | | | | | | |
| 00 | | | | | | | | | | | | | | |
| 2C16 | | | | | | | | | | | | | | |
| 00 | | | | | | | | | | | | | | |
| 2D16 | | | | | | | | | | | | | | |

IMAGE REPRODUCING SYSTEM

This application is a division of application Ser. No. 323,162 filed Mar. 15, 1989, now U.S. Pat. No. 4,888,636 which was a continuation of application Ser. No. 586,774 filed Mar. 3, 1984, now abandoned.

BACKGROUND OF THE INVENTION

1. Field of the Invention

The present invention relates to an image reproducing system such as a copying apparatus, a document reader, a printer and so on.

2. Description of the Prior Art

As an example, a color reproducing printer using a photosensitive drum is explained in the following.

The printer is such a type of apparatus that processes color signals of B, G and R to control a laser beam from each latent color image of Y, M, C and BK on the photosensitive drum, develops the latent image by each developer of Y, M, C and transfers the color image on a transfer paper to form a color image. In this case, the color image quality is apt to deteriorate due to fatigue or lapse of time. Consequently, unreasonably frequent maintenance service may be required.

So far a copy registration (alignment) has been usually performed by adjusting the starting timing of light beam irradiation to the drum or by adjusting the timing of transfer paper feed while observing a reproduced image of a test sample original.

Also each balance adjustment has been performed by means of adjusting the voltage applied to the charging electrode while observing the reproduced image. As an example, FIG. 9 shows a reproduced image of the test chart as illustrated in FIG. 8. This is, the case where the R image shifts to the lower right and further the image density of the R image is higher. In such case, however, if the reading unit and the image reproducing unit are separated by a long distance, from each other, such as being located in different buildings, the above-mentioned adjustments have been difficult.

SUMMARY OF THE INVENTION

It is an object of the present invention to provide an image reproducing system capable of obtaining good image quality by removing the foregoing defects.

Another object of the invention is to provide an image reproducing system capable of performing an image quality control reading.

A further object of the present invention is to provide an improved color image reproducing system.

Yet another object of the present invention is to provide an image reproducing system capable of producing a color image of a stable and good quality on the basis of the processed outputs of a reference tonality signal.

Still a further object of the present invention is to provide an image reproducing system capable of permitting an easy registration and readily controlling color balance while observing a reproduced image on the basis of the signal generated by a generation circuit as provided in an image reproducinq unit or the like for generating the same signal as that of an original.

BRIEF DESCRIPTION OF THE DRAWINGS

FIG. 7 shows how

FIG. 11 is a memory map diagram; and

DESCRIPTION OF THE PREFERRED EMBODIMENT

Figure 1:
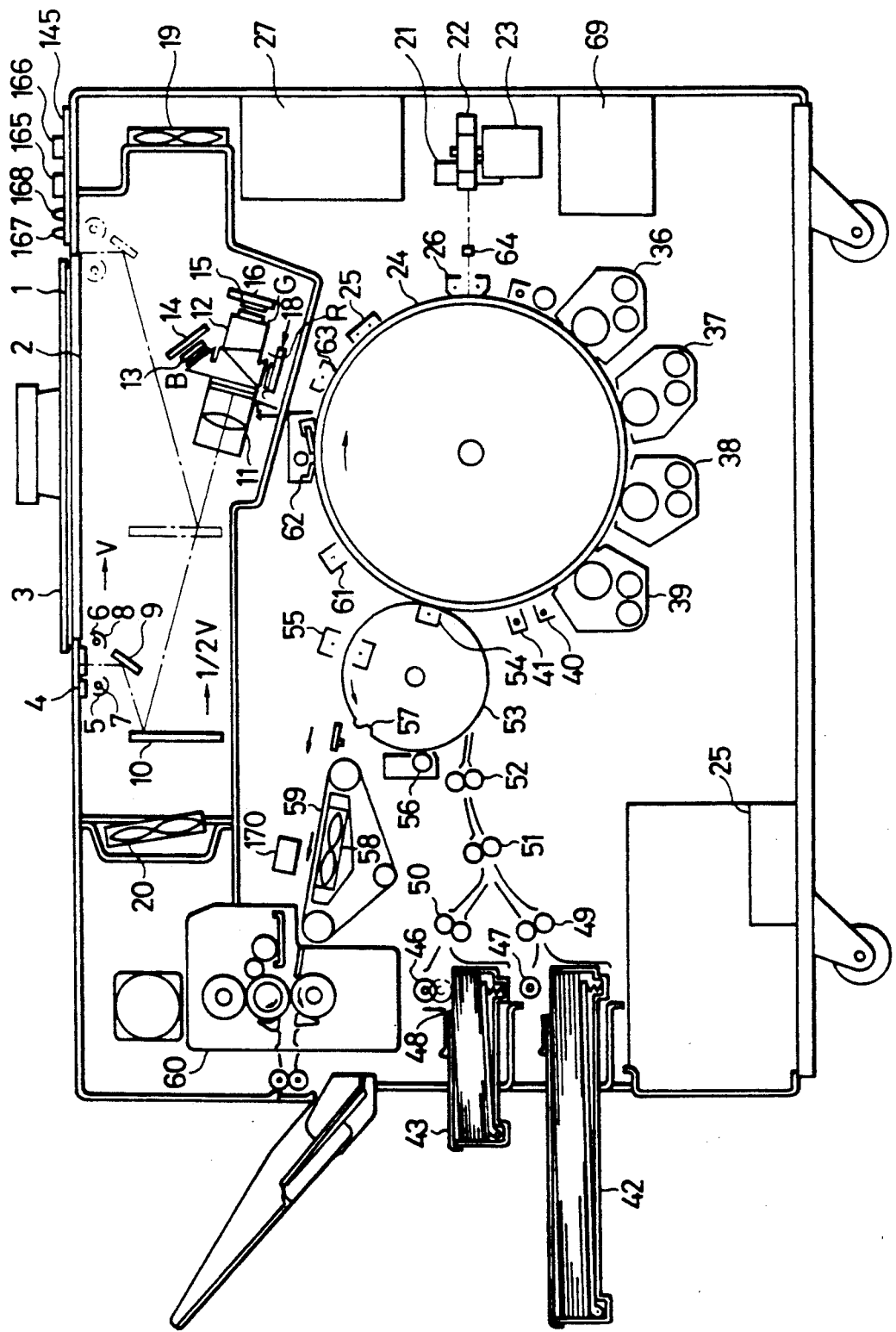
FIG. 1 is a sectional view of a color copying apparatus embodying the present invention.

FIG. 1 shows an embodiment according to this invention. An original 1 is put on a transparent plate 2 of an original table, being fixed by an original mat 3. Both a photosensitive drum 24 and a transfer drum 53 rotate in the direction of respective arrows, thus performing a color process. 12 denotes a spectrum dichroic mirror and 14, 16, 18 denote CCD sensors for sensing the spectrum to generate color signals of B, G and R, respectively. The original 1 is scanned by reciprocating a lamp 8 and mirrors 9, 10 so that color signals B, G and R are simultaneously outputted from CCD sensors to generate a reproducing signal Y. Then, the same reciprocation as above is conducted again to generate a signal M. Thus, the above scanning process is repeated four times to generate signals Y, M, C and BK, respectively. These signals control a laser beam to produce color latent images on the drum 24 sequentially. The latent images are developed successively and then transferred to the paper on the transfer drum 53 repeatedly by four times rotation of the transfer drum, thereby obtaining a copy of full color image.

As for an optical system, the light emitted from lighting lamps 7, 6 is irradiated on the original 3 together with the light from reflectors 5, 8. The reflected light therefrom from is reflected by movable reflectors 9, 10 and via a lens 11, passes through a dichroic filter 12, whereby the light is separated into spectra of blue, green and red, respectively. Among these spectra, the blue spectrum is received by a solid-state image pick-up element 14 through a blue filter 13. Similarly, the green spectrum is received by a solid-state image pick-up element 16 via a green filter 15, and the red spectrum by a solid-state image pick-up element 18 via a red filter 17. That is, an image of the original 3 is focused onto each of the image pick-up elements 14, 16, 18 through the lens 11 and the dichroic filter 12, while keeping the same optical path length by means of both the movable reflector 9 jointly moving with the lighting lamps 5, 6 and the movable reflector 10 moving in the same direction as of the reflector 9 with half speed of the reflector 9. The test chart 4 to be used for automatic control of color balance and tonality (gradient), as is stated later, is set at the first side of the original.

Upon setting a copy key 166 on with the condition of ON state of a test mode switch 165, the lighting lamp moving along the original, this test chart 4 is also scanned, and the CCD generates a reference signal. Each output of the image pick-up elements 14, 16, 18 is irradiated as the light output from a semiconductor laser 21 to a polygonal mirror 22 through an image processing unit 27 which will be described later. As the polygonal mirror is rotated by scanner motor 23, the laser beam is scanned perpendicularly to the rotating direction of the photosensitive drum. Further, photosensor 64 being situated 11 mm before the place where the laser beam starts to scan on the drum, generates the signals of B and D, being irradiated by the laser beam.

Sensitizing drum 24 is charged with negative electricity by negative electrifier 25 which is supplied with the negative high voltage current from a high voltage power source. Then, reading the exposure section 26, original chart 1 on transparent plate 2 of the original base, being lighted by lighting lamps 7, 6 forms the image on imaging elements 14, 16, 18 through mobile reflectors 9, 10, lens 11, dichroic filter 12, blue filter 13, green filter 15 and red filter 17 successively. The image output from the CCD, as seen in the block diagram (FIG. 2) of image processing section 27, undergoes the following correction with each color, i.e. shading correction by shading unit 28, $\gamma$ correction by $\gamma$ correction unit 29 (linearization of gradient), turbidity correction by masking unit 30, undercolor removing correction by UCR unit 31, gradation reproducing correction by the dither unit 32 and gradation-up correction by multivalved coding digitizer unit 33, and then via laser driver unit 34, modulates laser 21, which forms the image on sensitizing drum 24. The electrostatic latent figure which is formed there, enters into development counters 36, 37, 38 and 39 of four colors. Here, after resolution of the image into 3 colors by a single exposure scan, each process stated above is carried out, thereby sending the UCR output at each scan of B, G, R and BK (Black) respectively.. The configuration is set in such a way that if the light signal of one resolved color is selected, the corresponding development counter is selected accordingly. The development counter thus selected out, being performed by powder development by means of the magnetic blade method, converts the electrostatic latent image to positive one. Afterwards, owing to both midget lamp 40 for ghost used to eliminate the electrostatic latent image and negative post electrode 41 supplied from the power source of negative voltage 25, the electrostatic latent image is eliminated by being charged with negative electricity.

As the next step, a copy sheet 48 which has been supplied by rotating paper-feeding rollers 46, 47 from the cassette selected from two cassettes, top and bottom, 43, 42 from operating section 145, passes through the first register rollers, top and bottom 50, 49 then through the second register roller 52 via carrier roller 51, to be wound up on transfer drum 53, where the toner on sensitizing drum 24 is transferred to copy sheet 48 by means of the electrode 54 for transferring use. The transfers are carried out as many times as the numbers of colors selected and at each time, copy sheet 48 is de-electrified by de-electrifying electrode 55 which is supplied with high voltage from A.C. high voltage generator 25. Finishing the transferring operation as many times as were selected, the sheet is peeled off from gripper 57, held by on belt 59 by transferring fan 58, and then led to fixing section 60.

In the case of the test mode, the reference color signal by the test chart, through the image processing and process sequences stated above, is reproduced on the sheet and discharged. In this case, the scanning shift is shorter than the biggest size of the original sheet and rather around the size of test chart, thus aiming at reducing the time consumed.

Figure 2:
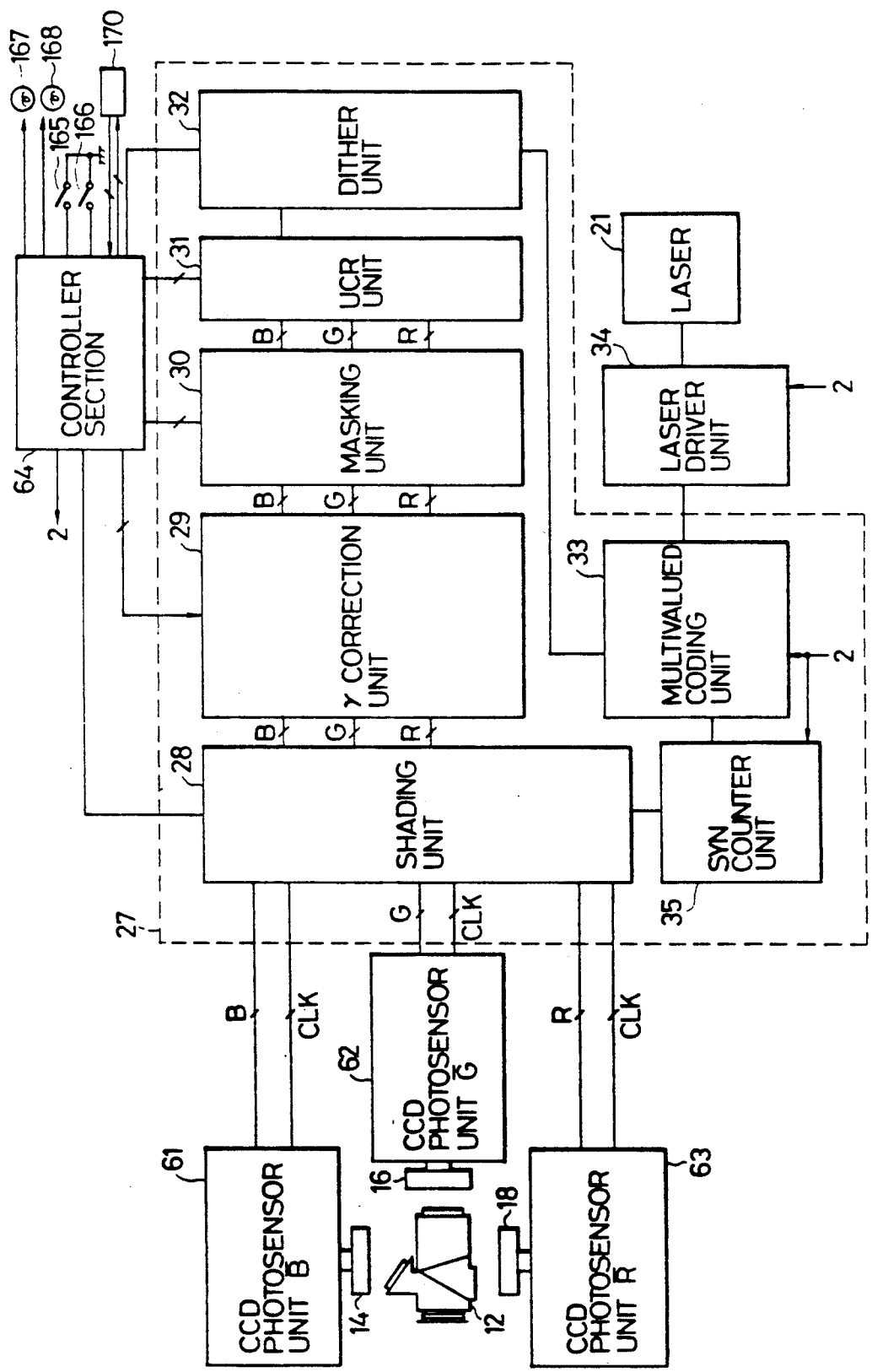
FIG. 2 is a block diagram of an image processor portion.

FIG. 2 shows the block diagram of the image processing unit. The light of the original sheet resolved into 3 colors by the dichroic filter, is photosensed by imaging elements (14, 16, 18). Their outputs are received by CCD photosensor units (61, 62, 63), and information of plural pixels in the CCD is intensified therein. The outputs of the CCD photosensor units are converted through an A/D convertor and then sent to next to shading unit (28). Then, when the optical system passes through the white color part of chart (4) from controller section (64), signals are generated, and it is shading unit (28) that corrects the output level of CCD to become constant. Following shading unit (28), the input sensitivity of the CCD is switched by the signal from controller section (64) in the $\gamma$ correction unit. That signal, each one of B, G and R being processed simultaneously in masking unit (30), undergoes color correction with changes in the mixing ratio of each color component. The mixing ratio of each color component is set by switching the signal from the controller section. Then, by judging this signal in the UCR unit, the minimum value signal of B, G and R is obtained. The controller section signal causes the minimum value signal to be multiplied by an arbitrary coefficient, and the resulting product is meant as the black level signal. It depends on the controller section signal whether or not this black level value should be reduced from each color. Here, out of signals of each color of B, G, R and BK, the signal of one single color is sent to dither unit 32 by the select-signal of controller section 64. At this dither unit 32, the signal of each color, having been compared with regard to its depth, for example, equal to a 6-bit signal, by means of ROM of the table reference, is converted to the digital signal of 1.0, so as to make the modulation by the laser easier. Then, the signal is sent to multivalued coding unit 33 which selects the output from the block to be set up for dither processing in a parallel row within dither unit 32, that is to say, the dither ROMs arranged with higher as well as lower levels of threshold value. This unit enables one pixel to be displayed in 3 grades (high, medium, low) of concentration and is controlled for selection by the controller section. This multilevel digitizer unit is to output one pixel as pulse amplitude of 1, 0.5 or 0 and this output drives the laser 21 by laser driver unit 34. At this unit, the input signal and the two dither ROMs described above are simultaneously compared by the comparator and each of resulting outputs is controlled sequentially by timing to be output in "or" relation. In addition, the pattern of the dither ROM varies by each color.

Figure 3:
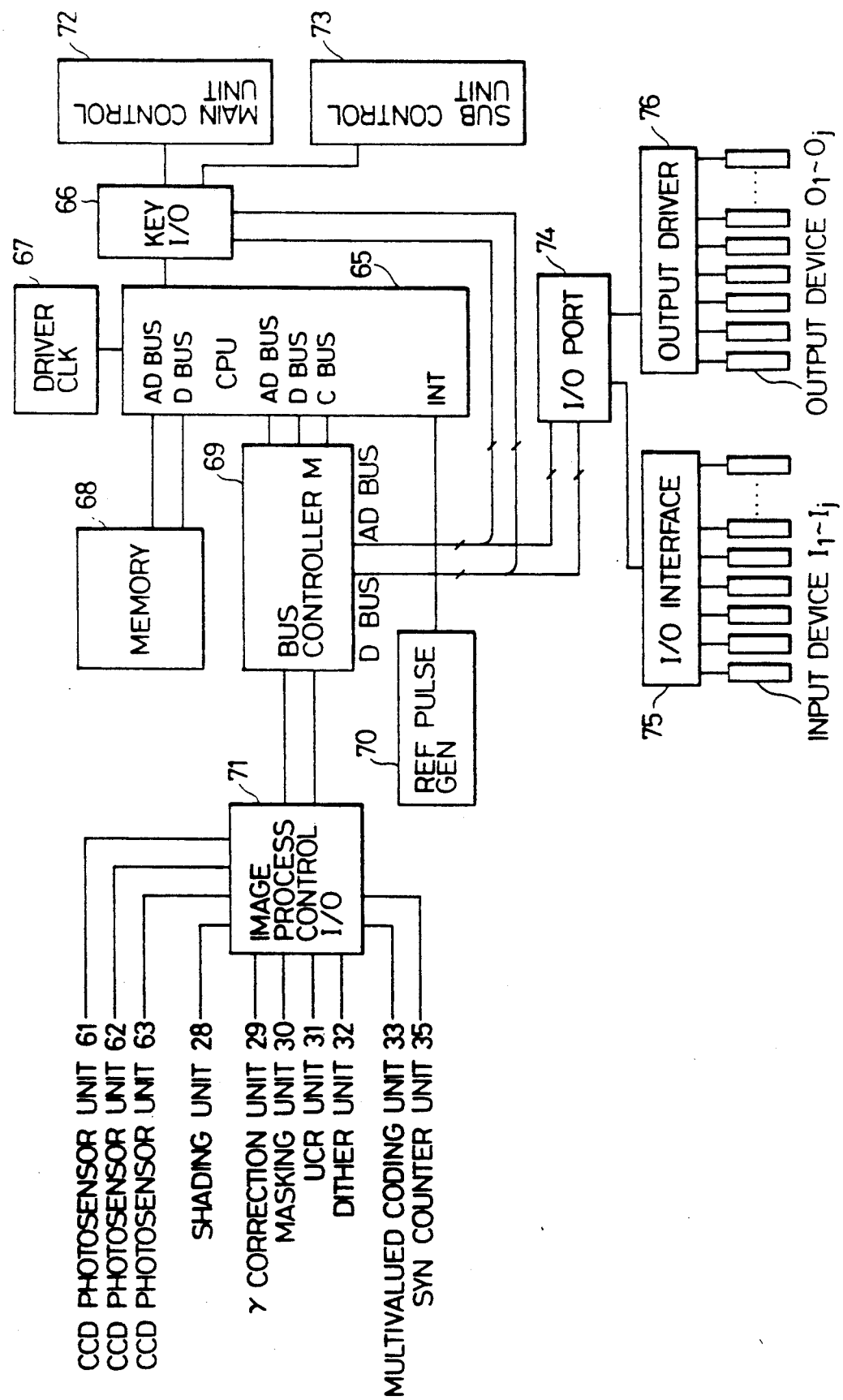
FIG. 3 is a block diagram of central processing unit.
Figure 4:
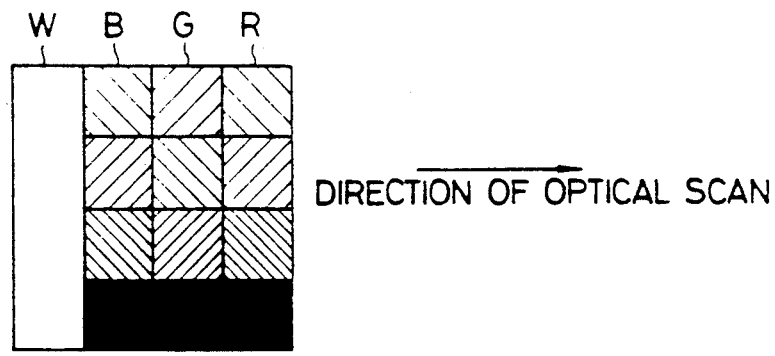
FIG. 4 is a test chart.

FIG. 3 shows the block diagram of the controller section. When main control unit 72 for the user and sub control unit 73 for the serviceman etc. are operated, the operating data is entried by control bus CBUS of CPU 65 via key I/O 66 from bus controller 69, driving to operate the reproduction in accordance with the content of memory section 68. In this operation, CPU 65 inputs signals of input devices $I_i$–$I_j$ through I/O port 74 from I/O interface 75 by bus controller CBUS, then causing both output driver 76 and output devices $O_i$–$O_j$ to operate. In addition, the CPU outputs operation data via the control bus from main control unit 72 or sub control unit 73 to image process control I/O 71, to supply the control data to the image process control section. The sequence of this duplicating machine is controlled by inputting the clock signal from reference pulse generator 70 driven by the drum motor into INT of the CPU 65.

The instruction input signal and each signal of the input switch sensor both of which are related with the test mode, is input through I/O interface 75.

Photosensor unit 170 which is composed of light emitting diodes LED and phototransistors is set up on the path to fixing device 60 so as to read out chart images formed on the copy sheet.

Figure 5:
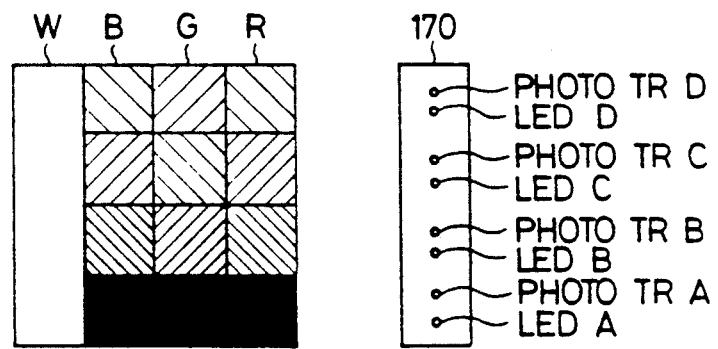
FIG. 5 is a diagram showing relative location between a reproduced diagram of the chart and photosensor location.

FIG. 5 shows the position of the images in the chart 4 formed on the copy sheet as well as the arrangement of photosensor unit 170, consisting of the reflecting type of sensors, in which the phototransistors and LEDs are placed alternatively one after the other, as seen from the figure.

FIG. 7 shows a flow chart indicating the color correction control, which is programmed in memory 68 (FIG. 3) of the microcomputer CPU in the controller section of FIG. 2. The CPU is connected with test mode switch 165, copy key 166, alarm lamp 167, stop lamp 168 and sensor unit 170.

Generally speaking, as either the photosensitive drum or the developer becomes fatigued, the concentration of the colors becomes lower and in addition to the difference in the contrast between the dark and light portions becomes less.

In the case of this invention, when the above difference is detected to be small, such memory in which $\gamma$ curve is steeper than in the conventional memory device, that is to say, the amount of change of the output data is greater than that of the input one, is selected so as to keep the gradation constant.

The first thing to do after the test mode switch 165 is set on, is to judge on the input of the reset button (step 1a). For example, there are ROM memories in which 4 kinds of $\gamma$ curves are set for each color, corresponding to 3 colors, and the above judgement is meant to select for each color the memory in which the inclination of the $\gamma$ curve is the most gradual, among other ones and the selection is made to select switches $SWB_1$, $SWG_1$ and $SWR_1$. For example, as for the switch to determine $\gamma$ of blue image, there are four switches, i.e. $SWB_1$, $SWB_2$, $SWB_3$ and $SWB_4$ and the one with the bigger figure is used for the $\gamma$ with the steeper inclination.

For maintenance, for example, immediately after the exchange of the drum, the reset button (not shown) is pushed down by a serviceman to set on the switches $SWB_1$, $SWG_1$ and $SWR_1$, thus resetting the $\gamma$.

In the meantime, by counting the clock input from reference pulse generator 70 in synchronization with a motor for driving the drum at the opening of the formation of a latent image on the drum, main unit controller 64 decides a timing when the center of white color of the patch image has arises under photosensor 170 (step 4a), reads out a signal from photosensor 170 (step 5d), when there arises the difference e.g. over 0.1 volts among four phototransistors which sense a pattern with different gradients 6a, and adjusts the current which flows through a light emitting diode 7a, to eliminate the difference. This can be done by automatically controlling LED 170 by means of a digital-to-analog conversion signal. Excluding the adjustment of said difference into nought, by storing the amount of scatter between these phototransistors, said amount can be corrected thereby to implement a pre-correction when the images of B, G and R are read out. Then, in the same way as in step 4a, when the center of blue of the patch image is sensed (step 8a), the signal from the photosensor is taken in (step 9a) and the difference among the four phototransistors amounts to a definite value, for example, a value over 0.6 Volts, it is decided that the gradient is enough (step 10a), when the value is less than 0.59 Volts, it is decided which one of the $\gamma$ selection switches $SWB_{1-4}$ of $\gamma$ memories per color being selected at present is ON in steps 11a, 12a, 13a, and then for instance when a $SWB_1$ is on, the switch $SWB_1$ is switched to OFF and next $SWB_2$ is switched to ON. Since there is no steeper $\gamma$ memory than on $SWB_4$, alarm lamp 167 indicates that no worse condition of image quality could be corrected in step 18a.

When the fatigue proceeds more and more, illuminating lamps 5, 6 are broken, or other emergencies arise so that an ordinary image can not be formed as detected in 13a, stopping lamp 168 turns on 14a and a subsequence copying operation is inhibited until the resetting button is depressed. Next, the same process is executed in Green and Red as in the above-mentioned process.

Whether there is a predetermined voltage between each phototransistor or not can be decided by judging whether each output of analog operational amplifiers each provided between two phototransistors, is 1 or not. Thus, a specific memory of $\gamma$ correction unit 29 per color is selected from the test chart.

A gradient characteristic can be reproduced faithfully by the methods that the arrangement of threshold values of said dither ROMs is selected by means of a gradient decision signal, or the multi-valuation processing level of multi-valuation units any one of 2-, 3- or 4-value is selected.

A backup means is arranged in image processing unit 27 so as to be apt to select the same correction circuit as in the subsequent copying operation, even if a main switch is turned off, once a $\gamma$ memory has been selected.

This invention is applicable in a color printer that can print by virtue of four dots per pixel. Even when the B, G, R signal 5 are transmitted from a host computer, it can be completed by the means that the aforementioned reference color signals are generated from a host computer or from the inner portion, and then inputted into an input line B, G, R.

The present embodiment can be applied to a reproducing system by virtue of a monochromatic digital processing.

It is possible to construct a system that displays the result of the decision output on account, of the aforementioned gradient shift and regulated manually.

Figure 6:
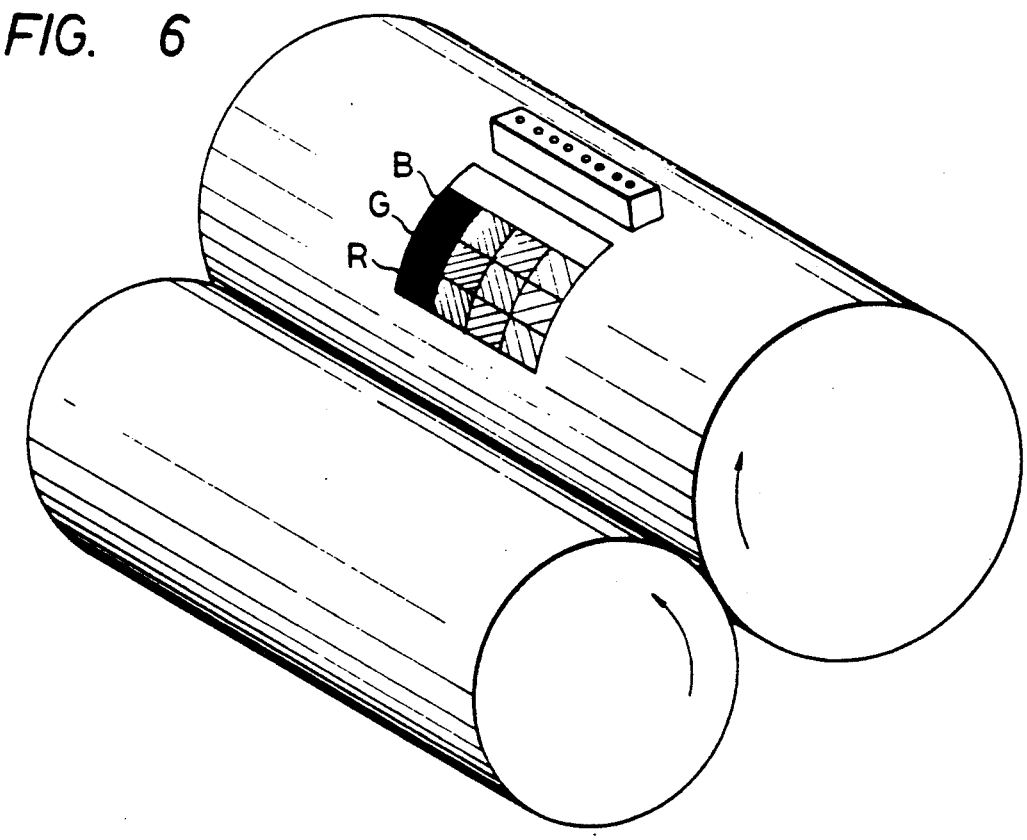
FIG. 6 is a diagram showing relative location between the reproduced diagram of a chart in another embodiment and photosensor location.
Figure 7A:
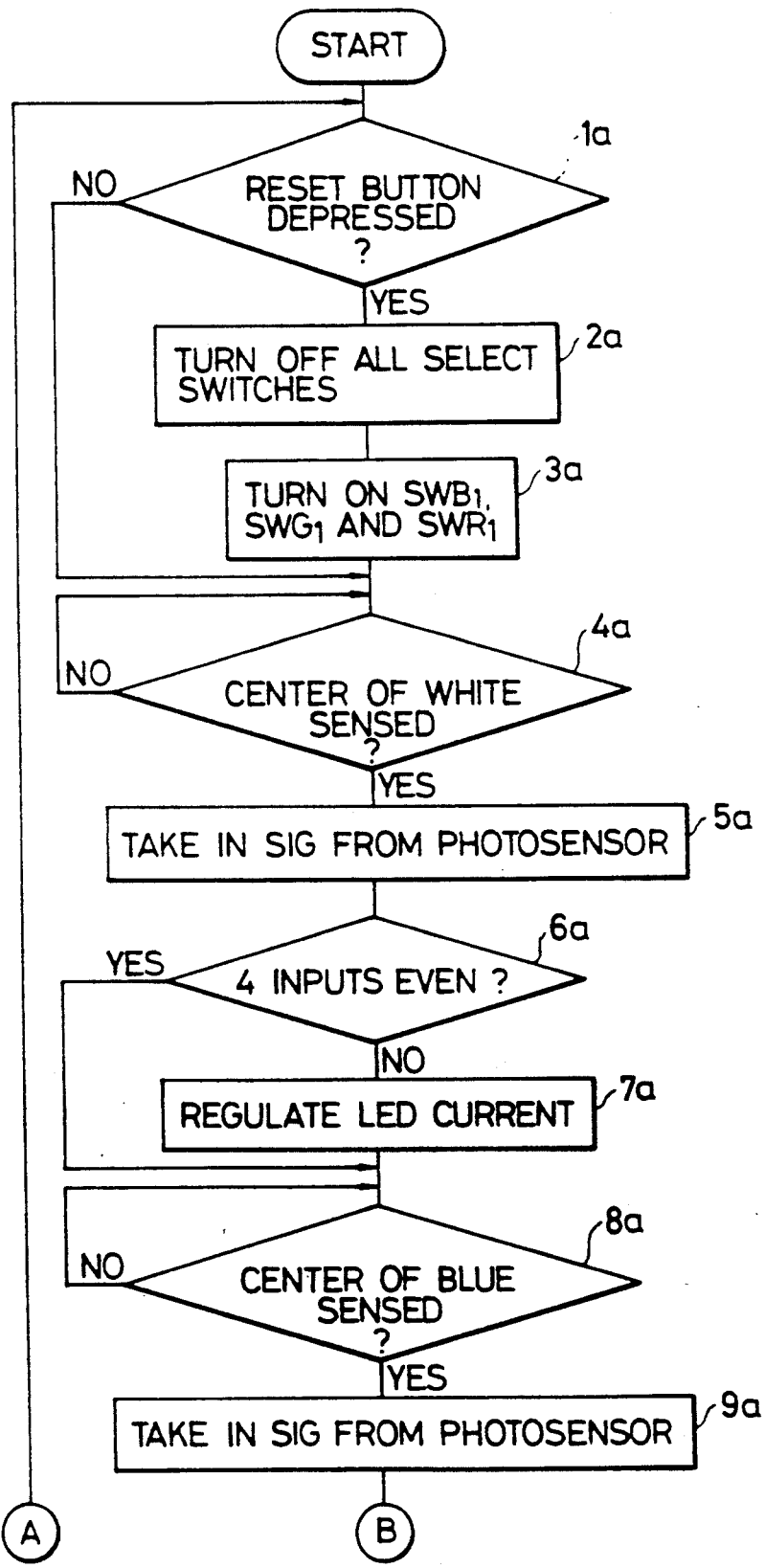
FIGS. 7A, 7B, 7C and 7D are assembled to form a control flow-chart.
Figure 7B:
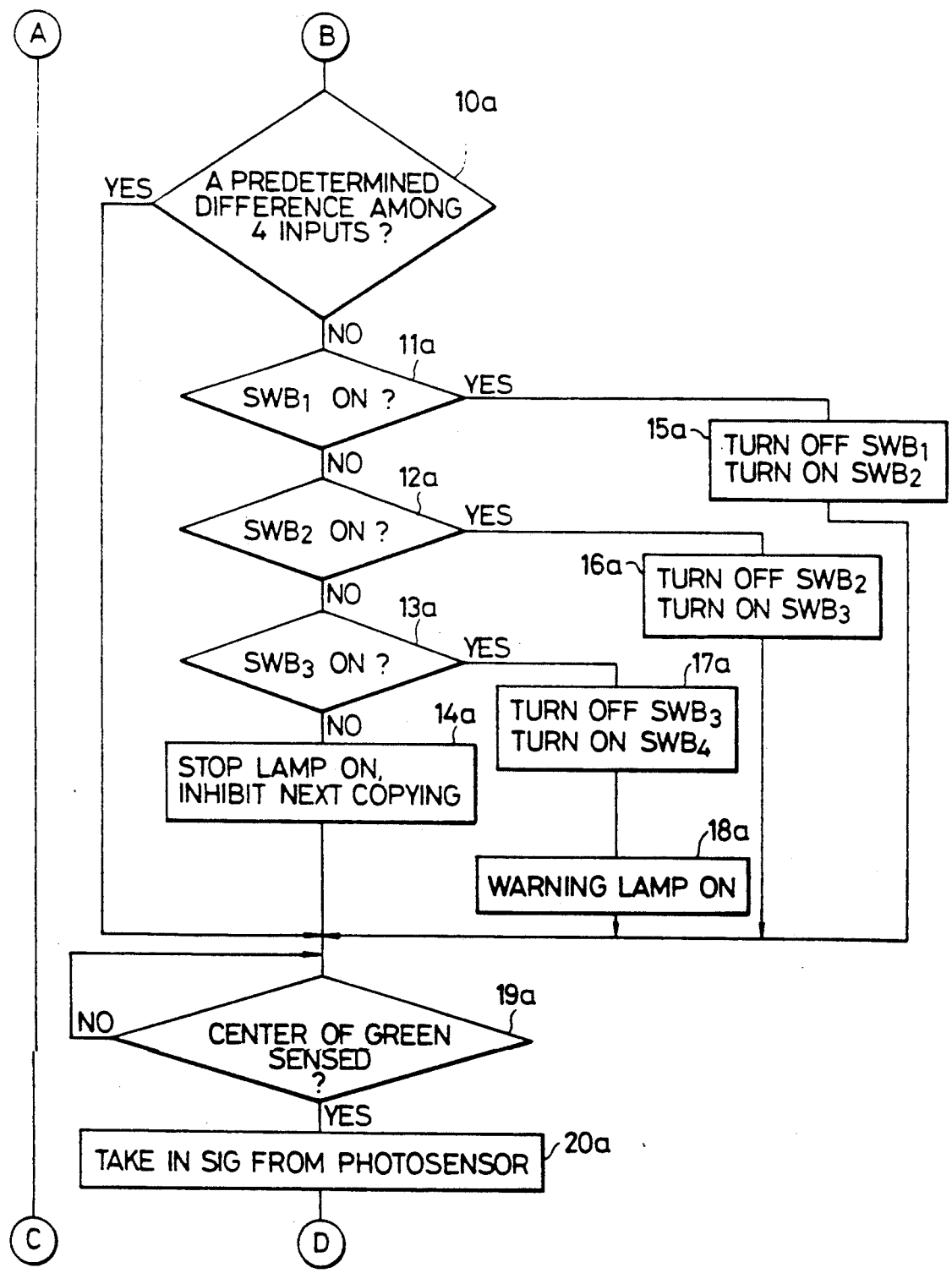
Figure 7C:
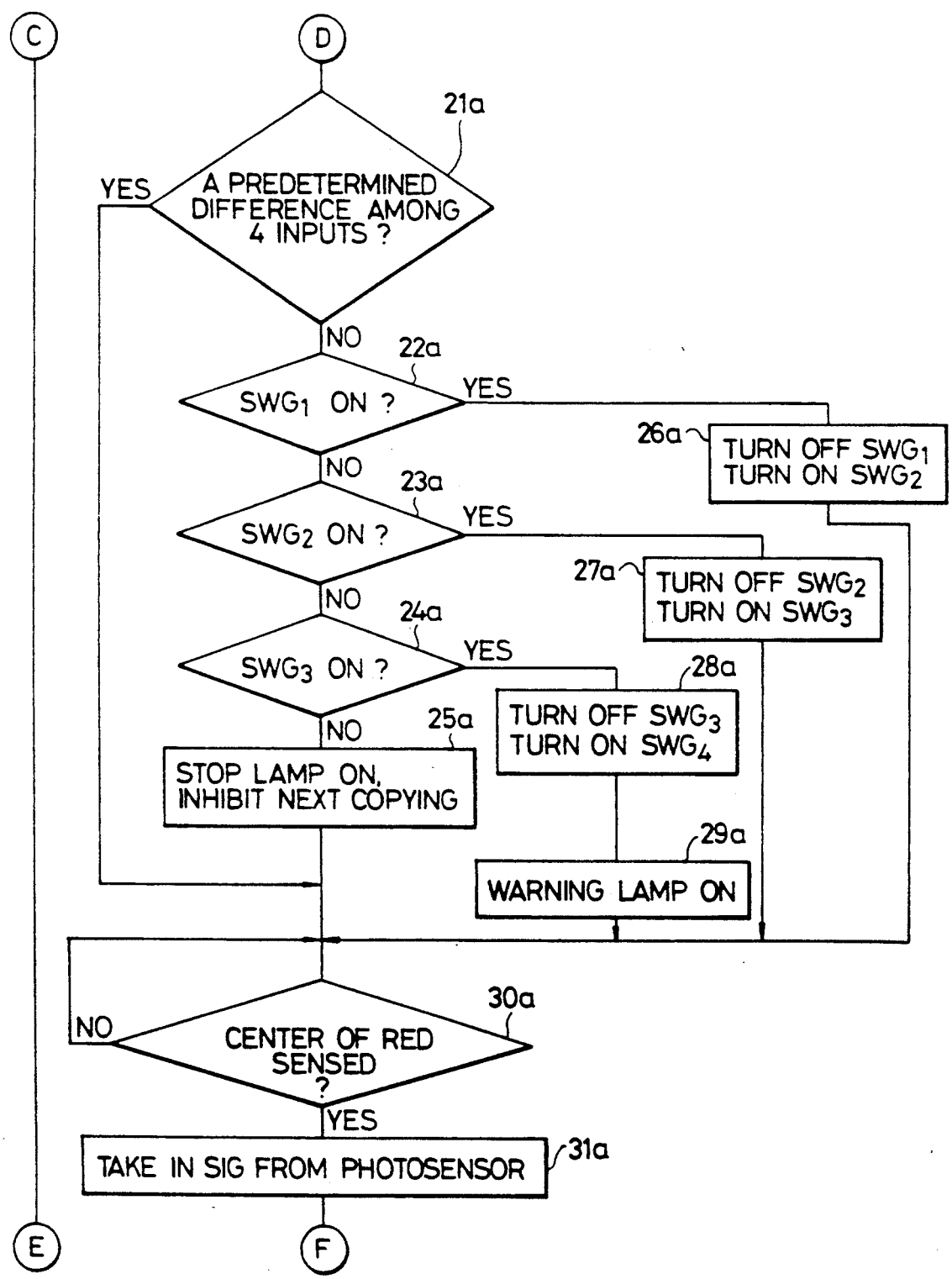
Figure 7D:
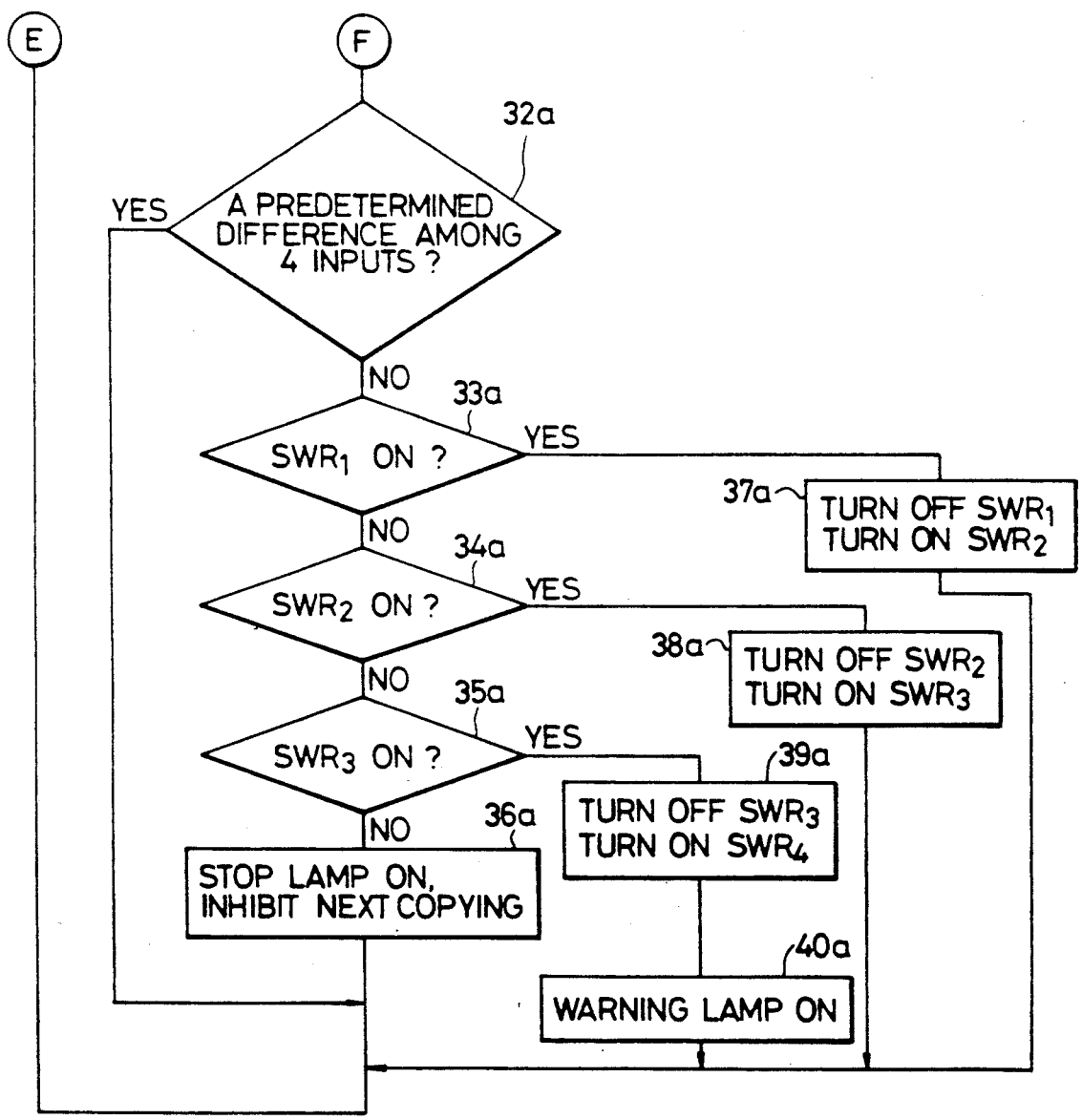

As for another embodiment, without transferring an image of the chart into a copying paper, it is possible to form it on the position of the drum in FIG. 6, then detecting the image of the chart on the drum by means of a phototransistor to correct in the course of a regular copying without providing a test mode. It is also attainable by measuring the potential of the drum surface responsive to the test chart. Moreover, it is able to correct it by measuring output signals Y, M and C responsive to the test chart from the UCR processing unit. The photosensor may be composed of the combination of a lamp with a CCD.

By extending the distance between CCD photosensor units 61, 62, 63 and the shading unit 28 of FIG. 2, the invention is usable as a communication unit extending over, for instance, numerous buildings It is also possible to build-in a circuit that generates the same signal as in reading the chart without attaching the chart thereupon.

By replacing a memory that could read and select the image of charts, another γ curve is attained, and further, by altering the turn-on voltage of the illuminating lamps 7, 6, voltage of the charging electrode 63, light quantity of the laser 21 and gain of the CCD amplifier, it is possible to spread the correction range. Moreover, it is possible to generate the reference signals for adjustment of a gradient and a color balancing, to process them, to decide the appropriate value of color balancing on the basis of the processed result, to alarm and to inform an operator of the necessity of adjustment by means of a display unit. In order to correct the unsuitableness of balance automatically, it is possible to control the means for the copying process. As is the case it is applied to the registration of paper and images. When the display unit displays the unsuitableness, it is possible to update the display dependent on the decision as to whether it is unsuitable or not whenever the input means for adjustment (dials, keys and so on) of color balancing, registration and gradient is operated. By means of these input means, corona voltage and developing bias are switched over.

Figure 10:
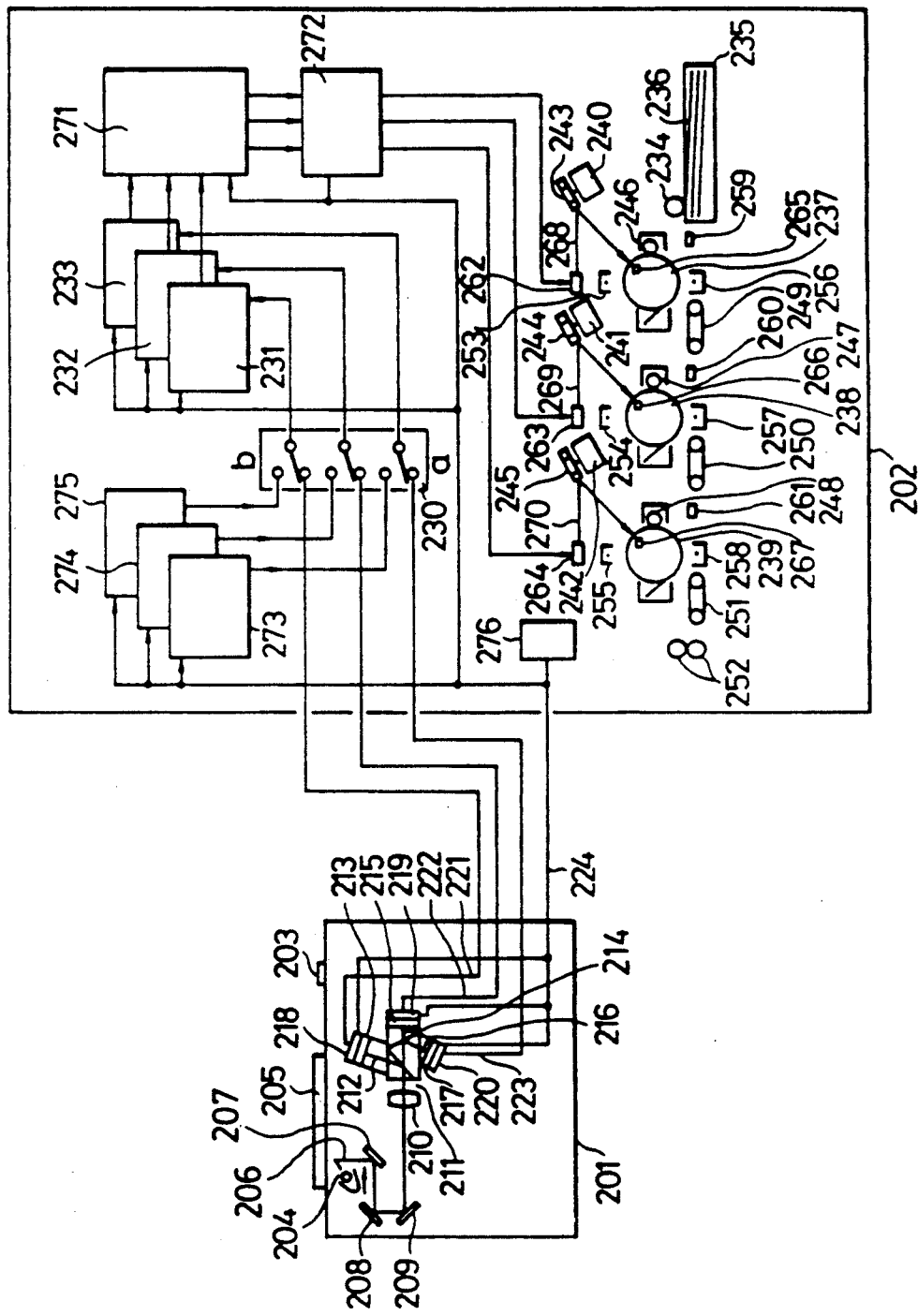
FIG. 10 is a block of diagram an image reproducing system adaptable to the invention.

FIG. 10 shows another embodiment wherein 201 denotes a read portion of an original and 202 an image reproducing portion. 203 is a starting button for scanning the original and starting the transfer of image data. 204 is an exposure lamp for illuminating the original, 205 an original which is copied by the image reproducing unit, and 206 a reflective light from the original which is focused at a CCD through mirrors 207, 208 and 209 a lens 210 and a dichroic mirror. 207 represents a mirror A which moves with the same speed as of an exposure lamp, 208 a mirror B which moves with half a speed of the exposure lamp as a pair with a mirror 209, 211 a dichroic mirror which separates a white light into three colors of blue 212, green 214 and red 216, 213, 215 and 217 are CCD sensors which sense and alter the intensity of light into the intensity of voltage per pixel, and 218, 219, 220 are CCD amplifying circuits respectively which amplify the output voltage of a CCD per pixel and implement an analog-to-digital conversion. When an incident light to a CCD is large, it approximates to 00. 221, 222, 223 denote 8-bit parallel color signals after an A-D conversion, and 224 a clock signal for transferring the image signal. 230 denotes a selector which selects an image signal read out by a CCD or reading means or a signal from a non-volatile memory to store color resolving signals B, G, R in memories 231, 232, 233. 234 is a paper feed roller which sends out individually one sheets of transfer paper out of a transfer sheet housing cassette. 237, 238, 239 are photosensitive drums. After the drums are charged uniformly, only the area on the drum irradiated by the laser beam is charge-removed. 240, 241 and 242 are scanner motors which rotate the polygonal mirrors 243–245 for scanning a laser beam. 246 to 248 are developers which develop latent images into each visible image of blue, green and red. 252 are fixing rollers, 253, 254 and 255 are coronas for charging the drums, 256, 257 and 258 are transferring coronas, and 259, 260 and 261 are sensors for paper which detect a leading edge of transfer sheets to render the reference for starting a reproducing image formation on the photosensitive drum. And 262, 263 and 264 are laser units which output laser beams 268–270, and 265, 266 and 267 are BD sensors which sense the laser beam to after a definite time render the reference for starting writing data onto the photosensitive drum. 271 is an image signal processing circuit which implements γ correction, dither correction, UCR correction and so on for reproducing a half tone. 272 is a laser driver circuit which implements power amplification of image signals and turns on and off the laser. 273, 274 and 275 are non-volatile memories which in advance store the data per color for generating the same signals as those which the image read unit reads a test chart to generate. 276 is a clock signal oscillator circuit which generates a clock signal 224 for transferring an image signal.

Then, in the above-mentioned construction, when power source switches (not shown in a figure) of the original read unit 201 and the image reproducing unit 202 are turned on, a starting key 203 is depressed to turn on an exposure lamp 204. A light 206 irradiated from the exposure lamp which commences to move toward the right direction with a mirror A (207) is reflected at an original, 205, further reflected by a mirror 207, a mirror 208 and then a mirror 209 to enter a dichroic mirror 211 through a lens 210, thereby separated into color spectra. Among these spectra, a blue light 212 is focused at a CCD 213. Also a green light 214 is focused at a CCD 215. Then red light 216 is focused at a CCD 217. These CCD's output the voltage responsive to the quantity of light formed thereupon. An amplifying circuit for a CCD 218 amplifies a signal of the CCD 213, implements an A-D conversion and transmits a blue image signal 221 to the image reproducing unit 202. As is the same, an amplifying circuit 219 for a CCD amplifies a signal of the CCD 215, implements an A-D conversion and transmits a green image signal 222 to the image reproducing unit 202. Also, an amplifying circuit 220 for a CCD amplifies a signal of the CCD 217, implements an A-D conversion and transmits a red image signal 223 to the image reproducing, unit 202. The transfer of signals from said CCd's to CCD amplifying circuits and the transmission of each color image signal from CCD amplifying circuits to the image reproducing units are implemented in synchronism with a clock signal 224.

When a selector 230 selects a-side in the image reproducing unit, the image signals 221, 222, 223 sent from the original read unit 201 are synchronized with a clock signal 224 and stored in memories 231, 232, and 233. At that time, the paper feed roller 234, the photosensitive rollers 237, 238, 239, the scanner motors 240, 241, 242, the polygonal mirrors coupled directly to the motors 243, 244, 245, the developers 246, 247, 248, the carrying belts 249, 250, 251, and the fixing roller 252 commence to rotate. And the charging electrodes 253, 254, 255 and the transferring electrodes 256, 257, 258 are supplied with high DC voltages.

Only when the transfer sheet 236 comes to a sensor 259, after a predetermined time when a BD sensor 265 is irradiated by a laser beam 268, the image data stored in a memory 233 is sent to an image signal processing circuit 271 in synchronism with the clock signal 224.

After the image signal processing circuit 271 has performed such signal processes as a well-known UCR, masking and so on, it sends a signal to a laser driver circuit 272 which implements a power amplification to form a latent image made of dots upon the photosensitive drum 237 by turning on and off the laser 262. A latent image is developed by the developer 246, a red visible image is formed on the photosensitive drum 237 and an image of red color is formed on a transfer sheet when the transfer sheet passes through upon the transfer electrode.

Accordingly, if the period beginning from irradiation of the laser beam 268 onto the BD sensor until send-out of the image data from the memory 233 is prolonged, the visible image which is formed on the transfer sheet 236, moves to the right direction of the transfer sheet 236, and if the sensor 259 for detecting the leading edge of the transfer sheet 236 is approximated to the direction of the cassette 235 for involving transfer sheets, the visible image formed on the transfer sheet 236 shift up on the transfer sheet.

In the same way, a green image is superposed on the transfer sheet by the photosensitive drum 266, a blue image is superposed on the transfer sheet by the photosensitive drum 267, and then, after fixing by the fixing roller 252, the sheet is sent out of the machine to complete a color copying.

Figure 8:
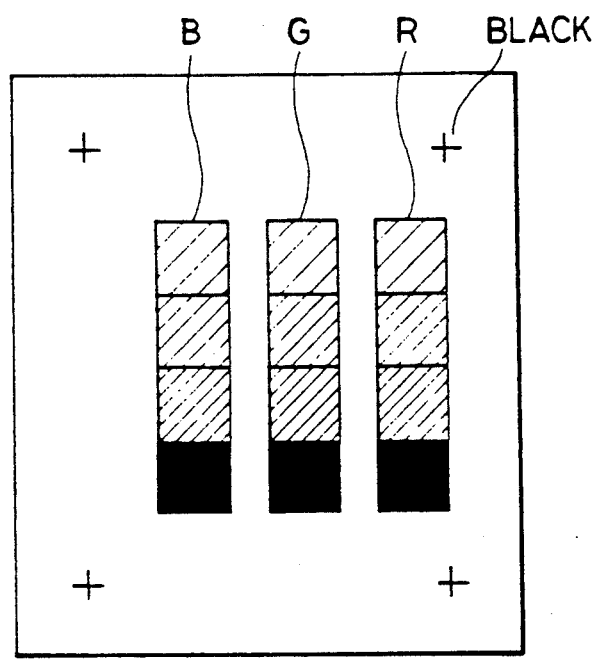
FIG. 8 is another test chart diagram.

As shown in FIG. 8, we shall explain the case that a test original is set on the image read unit and a starting button 203 is depressed. A blue image signal 221 is synchronized with a clock 224. Until there is produced such image that is stored in sequence from 0000-address through a selector 230, only 00 is stored. Though the image signal line 221 is expressed as one line, it usually contains a plurality of lines, for example, 8-bit lines which include density information.

The (+) part in the upper left of FIG. 8 is shown as an enlarged model in FIG. 11. In the model the data is stored in a memory B per pixel.

A test pattern reproduced on a transfer sheet or a drum is read by a photosensor or discrimination means and stored in a memory to implement automatic correction of color registration and color balancing.

Figure 12:
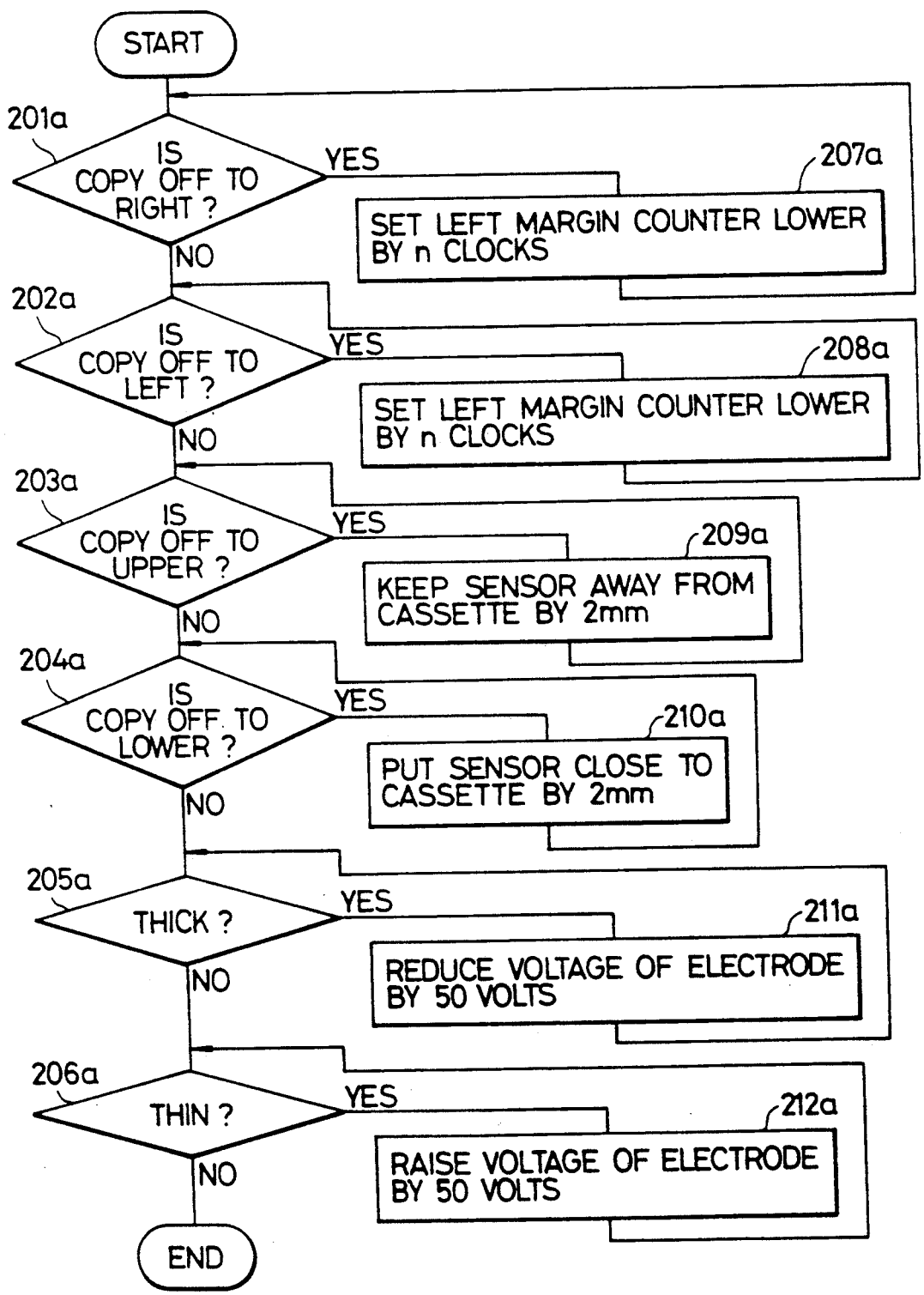
FIG. 12 is a modified flow-chart diagram.

FIG. 12 shows a correction flow-chart which is programmed in a main control unit (not shown). Regarding a photosensor it is preferable to use a CCD of the same size as a drum width. As for horizontal shift, it is corrected on the basis of the number of (+) marks and the decision of the locations by means of a CCD. As for vertical shift, it is corrected on the basis of the time difference between the timing signal in synchronism with the rotation of the drum and (+) mark sensing signal, and also as for density (thickness), it is corrected by comparing levels sensed by the CCD's with each other.

Figure 9:
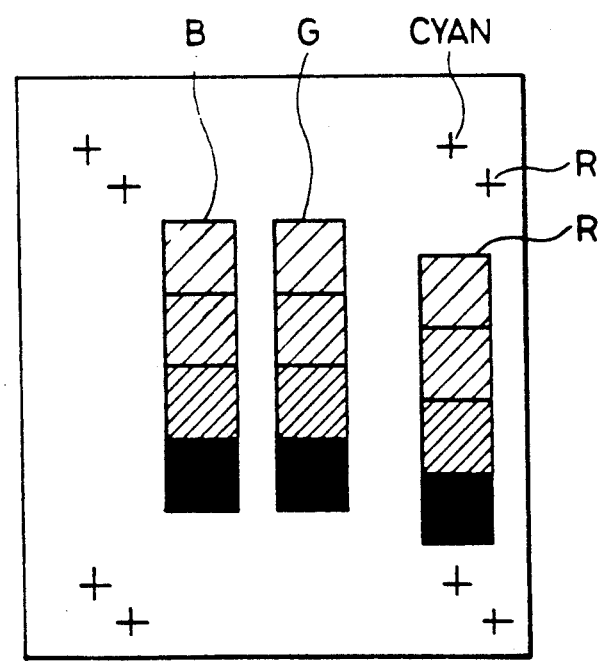
FIG. 9 is a reproduced image chart diagram.

Referring to FIG. 12 in relation to a reproduced copy shown on FIG. 9, there comes YES in Step 201a since a red image shifts right lower. So, a left margin counter is set lower by n clocks (Step 207a). This counter starts counting a predetermined number of clock signals (224 on FIG. 10) when well-known sensor BD receives a laser beam. Upon the time when the counter counts up the given counts, the beam commences to horizontally irradiate on the drum to form an image. If this correction eliminates the horizontal shift, the flow proceeds to Step 203a. The copy does not shift upper. Therefore, the step is NO and then the flow proceeds to Step 204a. As the copy shifts lower, the step is YES. In Step 210a, the sensor (261 on FIG. 10) is displaced closer by a predetermined distance (e.g. 5 mm) to the cassette so as to render an undermentioned timing period more ahead. This sensor decides a timing period when laser beam commences to vertically (i.e. in the rotationary direction of the drum) irradiate on the drum to form an image on the basis of detection of the leading edge of the transfer sheet. If the vertical shift is eliminated, the flow proceeds from Step 205a to 206a. The step is YES as the red image is thick (dark). Therefore, the step proceeds to Step 211a. Hence, voltage of the charging electrode 255 is reduced, for instance, by 50 V, to equalize each density of blue, green and red. Then, Step 206a is NO and the process is completed. In the case of the adjustment of blue or green, the flow chart in FIG. 12 is applicable to each color.

Then we will describe a circuit which generates a mark for adjustment. When such an original as in FIG. 8 is copied, the content stored in a memory 231 is the same as in FIG. 12.

Therefore, even though the image read unit 201 is taken away, memories 231, 232 and 233 are requested to store the same data as before.

That is to say, in a non-volatile memory 273, FF's are stored in the location of being provided to blacken an image and such a pattern as in FIG. 12 is memorized. When the data selector 230 is switched over to b-side to provide a clock from a clock generator circuit 276, a pseudo image signal is sent in synchronism with clock signal 224, from a non-volatile memory 273 to a memory 231, from a non-volatile memory 274 to a memory 232 and from a non-volatile memory 275 to a memory 233. Thus, as is the same as in an ordinary copying, an image is formed on a transfer sheet. It is usual to reproduce a blue image from a blue image signal, a green image from a green image signal and a red image from a red image signal.

If a pseudo image signal is "00", the concentration of reproduced image is minimum, and if a pseudo image signal is "FF", the concentration of reproduced image is maximum. As for the values between OO to FF, a half tone is reproduced by a dither circuit with an individual dither pattern per color under control of an image signal processing circuit 271.

In the image reproducing unit 202 in accordance with the present embodiment, three of photosensitive drums are used to superpose blue, green and red images to reproduce an image, but four photosensitive drums can be used to add black image to the aforementioned. Further only one photosensitive drum may be used in such manner of transferring the blue image into a transfer sheet, thereafter cleaning the drum, then transferring a green image, thereafter cleaning the drum again, and then transferring a red image. The present invention may be applied to other types of color printer such as of 4-dot per pixel.

And by switching over the data selector 230 during an image reproduction, it is possible to form an image composed of an image signal sent from an original read-out unit and a pseudo image signal from a non-volatile memory. In case of the intention of the correction alone without employing a test chart, a non-volatile memory may be built-in in an image read unit.

In this way, in accordance with the present invention a testing original is not necessary for adjustment and it is ready to adjust the timing for forming an image at the image reproducing unit and to correct density balancing of the reproduced image among various drums.

What I claim is:
1. An image forming system comprising:
   generating means for generating a pattern signal;
   recording means movable in relation to a recording medium, comprising a plurality of recording stations sequentially arranged, for each color, in a movement direction of said recording means, each of said recording stations recording a pattern for each color on the basis of the pattern signal generated by said generating means, the size of each recording station being substantially as long as a width the recording medium;

means for detecting a deviation of a pattern recorded by said recording means; and control means for controlling the registration or alignment of said each recording station on the basis of an output of said detecting means.

2. An image forming system according to claim 1, wherein said generating means comprises a non-volatile memory storing a reference pattern therein.

3. An image forming system according to claim 1, further comprising reading means for reading an original image and generating a plurality of color image signals.

4. An image forming system according to claim 3, wherein said plurality of recording stations include photosensitive drums, respectively.

5. An image forming system according to claim 4, wherein said recording means forms images corresponding to said color image signals on said photosensitive drums of said recording stations, respectively.

6. An image forming system according to claim 1, whrein said detecting means is a photosensor.

7. An image forming system according to claim 1, wherein said detecting means detects a deviation of a pattern, for each color, recorded by said recording means, in a main scan direction or a subscan direction.

8. An image forming system comprising:

generating means for generating a pattern signal;

first output means for outputting an image signal;

second output means for outputting an image signal corresponding to the pattern signal generated by said generating means;

recording means movable in relation to a recording medium, comprising a plurality of recording stations sequentially arranged, for each color, in a movement direction of said recording means, each of said recording stations recording a pattern for each color on the basis of the pattern signal generated by said generating means, the size of said each recording station being substantially as long as a width of the recording medium;

detecting means for detecting a deviation of a pattern recorded by said recording means; and means for controlling the registration or alignment of said each recording station on the basis of an output of said detecting means.

9. An image forming system according to claim 8, wherein said generating means comprises a non-volatile memory storing a reference pattern therein.

10. An image forming system according to claim 8, wherein said plurality of recording stations include rotary cylinder drums, respectively.

11. An image forming system according to claim 8, wherein said recording means forms images corresponding to said color image signals on said cylinder drums of said recording stations, respectively.

12. An image forming system according to claim 8, wherein said detecting means is a photosensor.

13. An image forming system according to claim 8, wherein said detecting means detects a deviation of a pattern, for each color, recorded by said recording means, in a main scan direction or subscan direction.

* * * * *

UNITED STATES PATENT AND TRADEMARK OFFICE
CERTIFICATE OF CORRECTION

PATENT NO. : 5,191,361
DATED : March 2, 1993
INVENTOR(S) : SHUNICHI ABE

It is certified that error appears in the above-indentified patent and that said Letters Patent is hereby corrected as shown below:

COVER PAGE
At [56], "Ohard" should read --Ohara--.
At [57], line 2, "plurality" should read --a plurality--; line 7, "relation" should read --relation to--; and line 13, "form" should read --formed--.

COLUMN 1
Line 35, "is," should read --is--.
Line 39, "distance," should read --distance--.
Line 60, "reproducinq" should read --reproducing--.

COLUMN 2
Line 13, "of diagram" should read --diagram of--.
Line 44, "from" should be deleted.
Line 57, "lamps 5," should read --lamps 7,--
Line 63, "on" should read --ON--.

COLUMN 3
Line 34, "respectively.." should read --respectively.--.

COLUMN 4
Line 10, "to next" should read --next--.
Line 38, "multivalued" should read --multi-valued--.
Line 57, "entried" should read --entered--.
Line 62, "bus controller" should read --control bus--.

UNITED STATES PATENT AND TRADEMARK OFFICE
CERTIFICATE OF CORRECTION

PATENT NO. : 5,191,361
DATED : March 2, 1993
INVENTOR(S) : SHUNICHI ABE

Page 2 of 3

It is certified that error appears in the above-indentified patent and that said Letters Patent is hereby corrected as shown below:

COLUMN 5
    Line 5, "sensor" should read --sensor,--.
    Line 55, "arises" should read --arrived--.

COLUMN 6
    Line 15, "lamps 5," should read --lamps 7,--.
    Line 17, "subsequence" should read --subsequent--.
    Line 39, "signal 5" should read --signals--.
    Line 48, "account," should read --account--.
    Line 65, "buildings" should read --buildings.--.

COLUMN 7
    Line 14, "process. As is" should read --process as in--.
    Line 31, "209" should read --209,--.
    Line 36, "216," should read --216.--.
    Line 50, "one" should be deleted.

COLUMN 8
    Line 35, "reproducing," should read --reproducing--.
    Line 36, "CCd's" should read --CCD's--.
    Line 41, "ā-side" should read --a-side--.

COLUMN 9
    Line 9, "shift" should read --shifts--.
    Line 35, "photosensor" should read --photosensor,--.
    Line 50, "on" should read --in--.
    Line 55, "upper." should read --up.--.
    Line 60, "undermentioned" should read --undetermined--.
    Line 62, "rotationary" should read --rotary--.

UNITED STATES PATENT AND TRADEMARK OFFICE
CERTIFICATE OF CORRECTION

PATENT NO. : 5,191,361
DATED : March 2, 1993
INVENTOR(S) : SHUNICHI ABE

It is certified that error appears in the above-indentified patent and that said Letters Patent is hereby corrected as shown below:

COLUMN 10
    Line 6, "Then" should read --Next,--.
    Line 36, "of" should be deleted.
    Line 46, "And" should read --Also,--
    Line 54, "invention" should read --invention,--.

Signed and Sealed this

Twelfth Day of April, 1994

Attest:

BRUCE LEHMAN

Attesting Officer

Commissioner of Patents and Trademarks